(12) United States Patent
Matsuki et al.

(10) Patent No.: US 7,192,202 B2
(45) Date of Patent: Mar. 20, 2007

(54) MIRROR APPARATUS

(75) Inventors: Kaoru Matsuki, Akishima (JP); Shinji Kaneko, Kokubunji (JP); Tsuyoshi Togawa, Hachioji (JP); Sumio Kawai, Hachioji (JP)

(73) Assignee: Olympus Corporation, Tokyo (JP)

( * ) Notice: Subject to any disclaimer, the term of this patent is extended or adjusted under 35 U.S.C. 154(b) by 214 days.

(21) Appl. No.: 10/953,486

(22) Filed: Sep. 29, 2004

(65) Prior Publication Data

US 2005/0073759 A1 Apr. 7, 2005

(30) Foreign Application Priority Data

Oct. 1, 2003 (JP) ............................. 2003-343454

(51) Int. Cl.
    G03B 19/12 (2006.01)
    H04N 5/225 (2006.01)
    H02N 1/00 (2006.01)
    G02B 26/08 (2006.01)

(52) U.S. Cl. ...................... 396/358; 348/344; 310/309; 359/223

(58) Field of Classification Search ................ 396/358; 348/344; 310/309; 359/223
    See application file for complete search history.

(56) References Cited

U.S. PATENT DOCUMENTS 5,523,639 A * 6/1996 Okamoto et al. ........... 310/309
6,390,692 B1 * 5/2002 Booth ......................... 396/358

FOREIGN PATENT DOCUMENTS

JP 02-106728 4/1990
JP 2000-75402 3/2000

* cited by examiner

Primary Examiner—W. B. Perkey
(74) Attorney, Agent, or Firm—Straub and Pokotylo; John C. Pokotylo

(57) ABSTRACT

A mirror apparatus has a reflecting surface to reflect an incident luminous flux. A fixed member has a plurality of driving electrodes on a surface of the fixed member. A movable member is formed with the reflecting surface on one side, and capable of escaping out of the optical path of the incident luminous flux along the fixed member. A driving circuit is capable of applying a voltage to the driving electrodes to generate an electrostatic force between the driving electrodes and movable members. A control circuit supplies a control signal to the driving circuit to change the electrostatic force acted on the movable member.

16 Claims, 9 Drawing Sheets

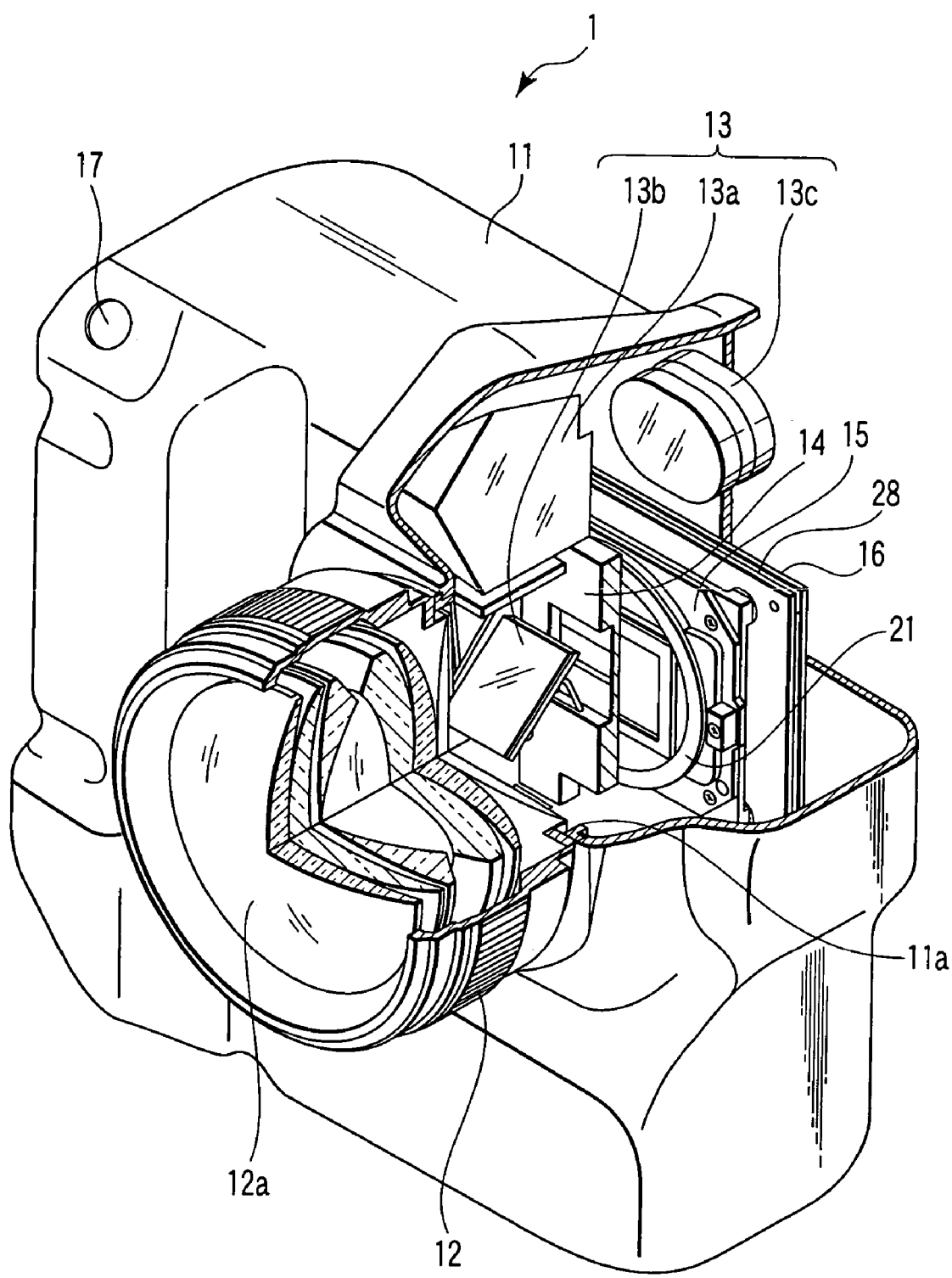
F I G. 1

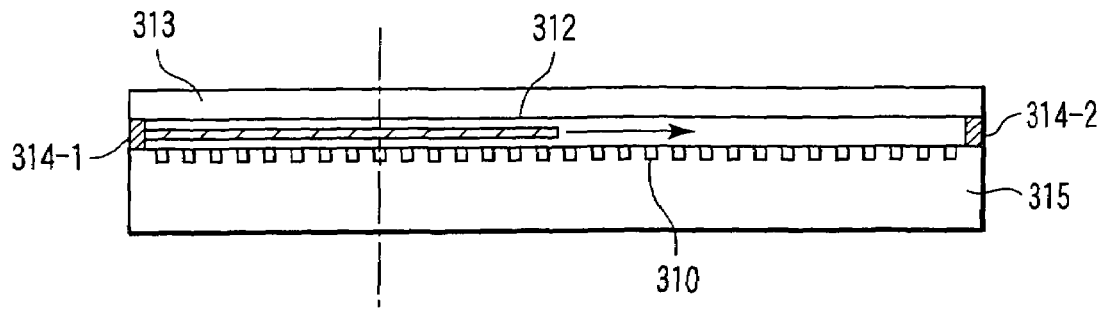
FIG. 3
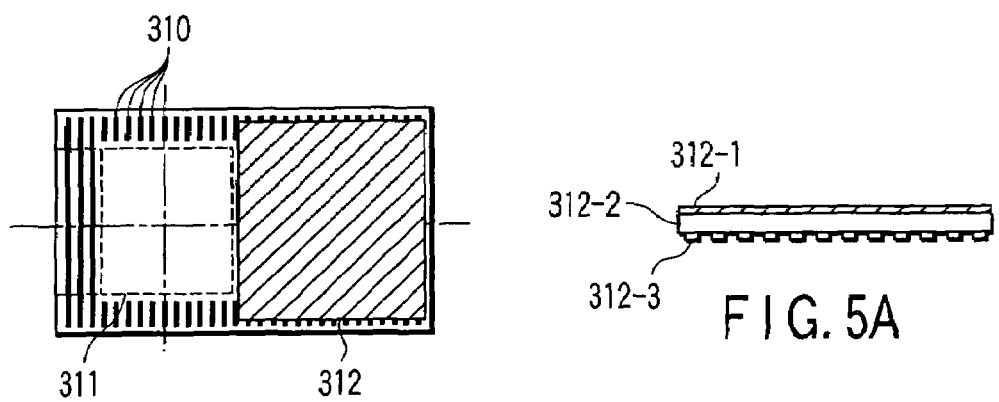
FIG. 4A
FIG. 5A
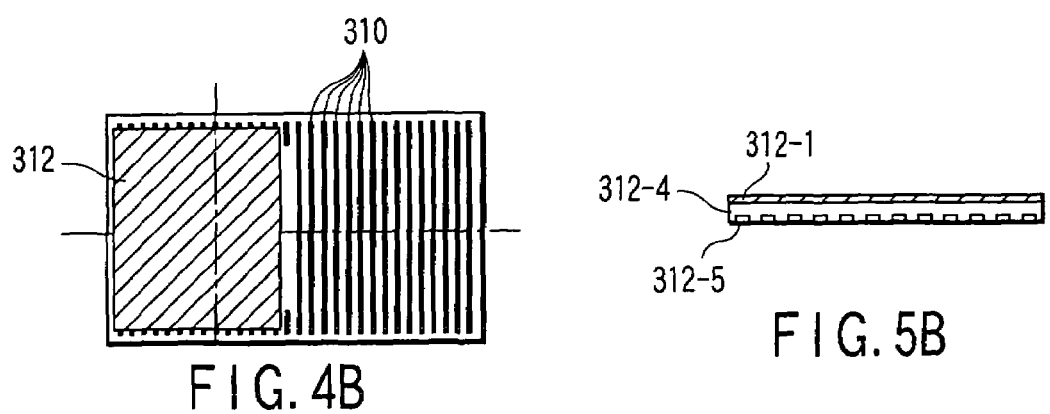
FIG. 4B
FIG. 5B

MIRROR APPARATUS

CROSS-REFERENCE TO RELATED APPLICATIONS

This application is based upon and claims the benefit of priority from prior Japanese Patent Application No. 2003-343454, filed Oct. 1, 2003, the entire contents of which are incorporated herein by reference.

BACKGROUND OF THE INVENTION

1. Field of the Invention

The present invention relates to a mirror apparatus.

2. Description of the Related Art

A quick return mirror is used in a camera to lead a luminous flux from a shooting optics to a pentagonal prism to permit a user to view an object at observation, and to lead the luminous flux to an image pickup element at shooting.

Jpn. Pat. Appln. KOKAI Publication No. 2000-75402 discloses a single-lens reflex camera provided with a quick return mirror rotatable and movable vertically through an axis of rotation. Published Japanese Patent No. 2578180 discloses a mechanism to drive a reflecting mirror with a motor in a single-lens reflex camera.

BRIEF SUMMARY OF THE INVENTION

According to an aspect of the present invention, there is provided a mirror apparatus having a reflecting surface to reflect an incident luminous flux, comprising:

a fixed member having a plurality of driving electrodes on a surface of the fixed member;

a movable member having the reflecting surface on one side, and capable of retreating out of the optical path of the incident luminous flux along the fixed member;

a driving circuit capable of applying a voltage to the driving electrodes to generate an electrostatic force between the driving electrodes and the movable member; and a control circuit for supplying a control signal to the driving circuit to change an electrostatic force acting on the movable member.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the embodiments given below, serve to explain the principles of the invention.

FIG. 1 is a partially broken away perspective view showing a schematic configuration of an embodiment of the present invention applied to a digital camera;

FIG. 3 is a view showing the schematic configuration of a movable mirror according to the embodiment;

FIGS. 4A and 4B are views showing the states of the movable mirror;

FIG. 5A is a sectional view showing the configuration of a movable mirror member, and FIG. 5B is a view showing a modification of the movable mirror member;

DETAILED DESCRIPTION OF THE INVENTION

Figure 2:
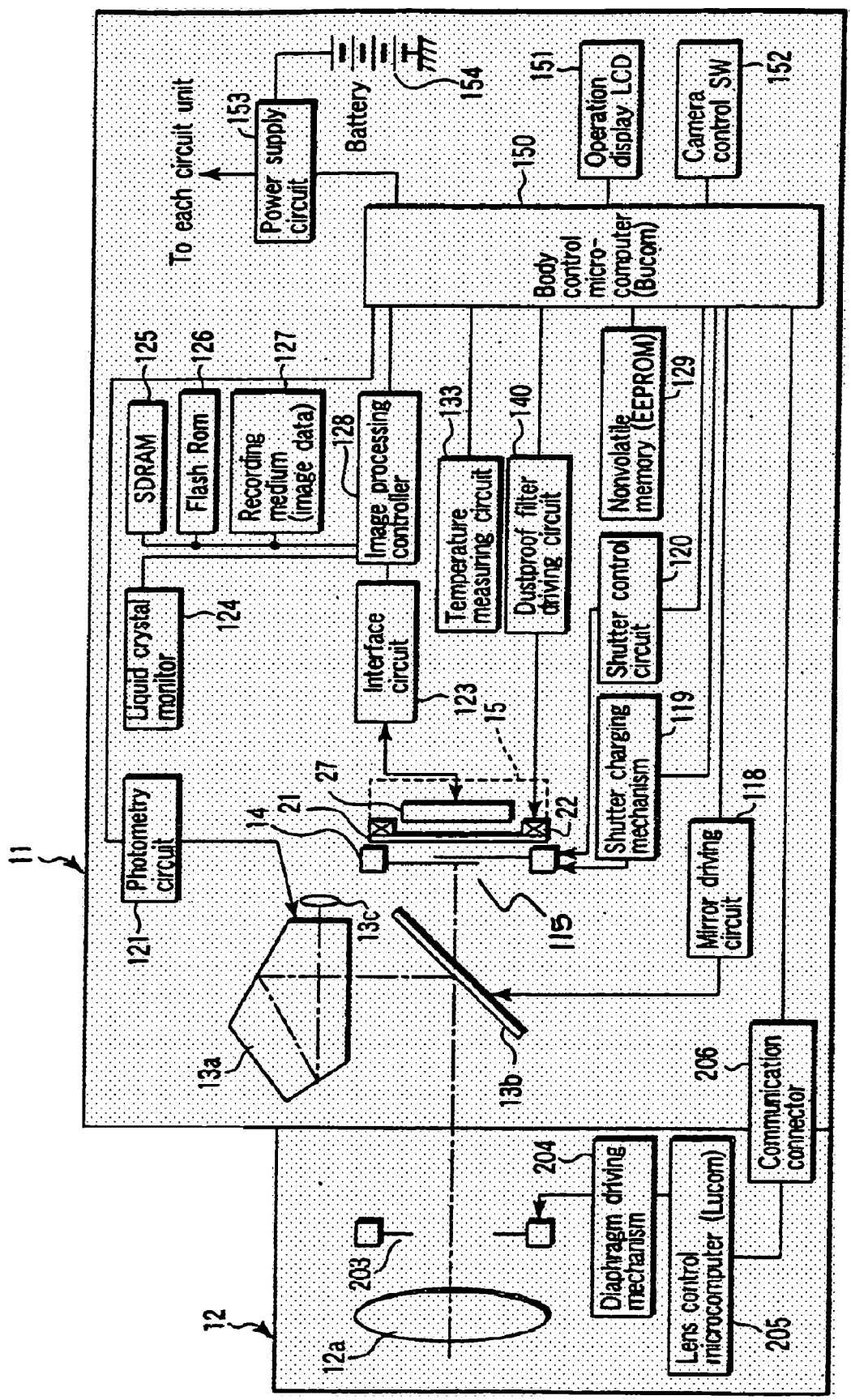
FIG. 2 is a block diagram showing the system configuration of a camera according to a first embodiment of the invention.

FIG. 1 is a partially broken away perspective view showing a schematic configuration of an embodiment of the present invention applied to a digital camera. A camera 1 of this embodiment consists of a camera body 11 and a lens tube 12, which are constructed as separate units. The camera body 11 and lens tube 12 are removable to each other.

The lens tube 12 is constructed to hold inside a shooting optics 12a consisting of lenses and a driving mechanism.

The shooting optics 12a consists of a plurality of optical lenses to form the image of an object formed by a luminous flux at a given position (on the photoelectric conversion surface of an image pickup element described later) by transmitting the luminous flux from an object.

The lens tube 12 is provided just like projecting toward the front of the camera body 11. The camera body 11 is a so-called single-lens reflex camera, which is composed of various internal members, and has a shooting optics mounting unit 11a in the front, which is a coupling member for mounting removably the lens tube 12 holding the shooting optics 12a.

At substantially the center of the front side of the camera body 11, there is provided an exposure opening with a given aperture capable of leading a luminous flux of an object to the inside of the camera body 11. The shooting optics mounting unit 11a is provided at the periphery of the exposure opening.

In the outside of the camera body 11, the shooting optics mounting unit 11a is provided at the front, and various control members to operate the camera body 11, for example, a release button 17 to generate an instruction signal to start shooting, are provided on the upper and rear sides.

At given positions inside the camera body 11, there are provided a finder unit 13 constituting a so-called observation optics, a shutter unit 14 having a shutter mechanism to control the radiating time of the object luminous flux to the photoelectric conversion surface of the image pickup element, an image pickup unit 15 which includes an image pickup element (not shown) to obtain the image signal corresponding to an object image, and a dustproof filter (also called a dustproof glass) 21 that is a dustproof member provided at a given position at the front of the photoelectric conversion surface of the image pickup element, to prevent adhesion of dust to the photoelectric conversion surface, and a plurality of circuit boards (only a main circuit board 16 is shown) including a main circuit board 16 to mount various electric members constituting an electric circuit.

The finder unit 13 is composed of a movable mirror mechanism 13b which is constructed to bend the optical axis of the object luminous flux transmitted through the shooting optics 12a and lead it to the observation optics, a pentagonal prism 13a which receives the luminous flux emitted from the movable mirror mechanism 13b and forms an erected normal image, and an eyepiece 13c which forms an image shaped optimum for observation by magnifying the image formed by the pentagonal prism 13a.

The movable mirror mechanism 13b is a reflector provided on the optical axis of the shooting optics 12a with a given angle, for example, 45° against the optical axis. Unlike a quick return mirror used in a conventional single-lens reflex camera, the movable mirror mechanism is constructed as a so-called electret mirror in which a film evaporated with electrified silver or aluminum is moved in a gap made between a glass base plate and a protection glass.

The electret mirror is constructed movable between the position retreated from the optical axis of the shooting optics 12c and a given position on the optical axis, and moved on the optical axis of the shooting optics 12a to reflect the object luminous flux to the pentagonal prism when observing an object image.

While the camera 1 is operated for shooting, the electret mirror is moved to a given position to retreat from the optical axis of the shooting optics 12a. In this case, the object luminous flux is led to the image pickup unit 15 through the protection glass and glass base plate. The electret mirror will be explained later in detail.

The shutter unit 14 adopts the one similar to those used commonly in conventional cameras, for example, a focal-plane shutter and a driving circuit.

FIG. 2 is a block diagram showing the system configuration of a camera according to a first embodiment of the invention. The camera system of the first embodiment is composed mainly of a camera body 11 and a lens tube 12 as an interchangeable lens. A desirable lens tube 12 is provided removably with respect to the front side of the camera body 11.

The lens tube 12 is controlled by a lens control micro-computer (hereinafter, called Lucom) 205. The camera body 11 is controlled by a body control micro-computer (hereinafter, called Bucom) 150.

These Lucom 205 and Bucom 150 are electrically connected through a communication connector 206 to permit mutual communication when they are combined. In this case, the Lucom 205 cooperates with the Bucom 150 as a slave in this camera system. The lens tube 12 is provided inside with a shooting optics 12a and a diaphragm 203. The diaphragm 203 is driven by a stepping motor (not shown) provided in a driving mechanism 204. The Lucom 205 follows the instructions from the Bucom 150, and controls the motor.

The camera body 11 is provided with single-lens reflex camera components as optics (a pentagonal prism 13a, a movable mirror mechanism 13b and an eyepiece 13c) inside, and a focal-plane shutter 115 on the optical axis.

The camera body is also provided with a mirror driving circuit 118 to drive and control the movable mirror mechanism 13b, a shutter charging mechanism 119 to charge a spring force to drive the leading and trailing curtains of the shutter 115, a shutter control circuit 120 to control the motion of the leading and trailing curtains, and a photometry circuit 121 to measure and process based on the luminous flux from the pentagonal prism 13a.

On the optical axis, an image pickup element 27 for photoelectric conversion of an object image passed through the optics is provided as a photoelectric conversion element.

In this case, the image pickup element 27 is protected by the dustproof filter 21 that is made of a transparent glass member as an optical element provided between the pickup element 27 and the shooting optics 12a.

As a part of an oscillating means to oscillate the dustproof filter 21 at a given frequency, a piezo-electric element 22 is provided at the periphery of the filter 21.

The piezo-electric element 22 has two electrodes, and constructed to oscillate the dustproof filter 21 by a dustproof filter driving circuit 140 as a part of the oscillating means, to eliminate the dust adhered to the glass surface.

A temperature measuring circuit 133 is provided near the dustproof filter 21 to measure the temperatures around the image pickup element 27.

The camera system is also provided with an interface circuit 123 connected to the image pickup element 27, a liquid crystal monitor 124, a SDRAM 125 provided as a memory area, and an image processing controller 128 for processing images by using a Flash ROM 126 and a recording medium 127, thereby providing an electronic recording/display function as well as an electronic shooting function.

As another memory area, a nonvolatile memory means which stores control parameters necessary for controlling the camera, for example, a nonvolatile memory 129 consisting of EEPROM is provided accessible from the Bucom 150.

The Bucom 150 is also provided with an operation display LCD 151 which informs the user of the camera operating state by the display output, and a camera control switch (SW) 152.

The camera control switch 152 is a set of switches for operating the camera, including a release switch, a mode selector switch and a power switch.

Further, a battery 154 is provided as a power supply, and a power supply circuit 153 is provided to supply power to the circuit units of the camera by converting the supply voltage to the values required by the circuit units.

Now, explanation will be given on the operation of the camera system configured as described above. Each unit of the camera system is operated as follows.

First, the image processing controller 128 controls the interface circuit 123 according to the instructions from the Bucom 150, and takes in image data from the image pickup element 27. The image data is converted into a video signal by the image processing controller 128, and displayed in the liquid crystal monitor 124. The user can confirm the taken image by the image displayed in the liquid crystal monitor 124.

The SDRAM 125 is a temporary storage memory for image data, and used as a work area when the image data is converted. The image data is set to be stored in the recording medium 127 after being converted to JPEG data.

The image pickup element 27 is protected by the dustproof filter 21 made of transparent glass member, as described hereinbefore. The piezoelectric element 22 is provided at the periphery of the filter 21 to oscillate the glass surface. The piezoelectric element 22 is driven by the dustproof filter driving-circuit 140.

The image pickup element 27 and piezoelectric element 22 are preferably housed as one body in a case surrounded by a frame taking the dustproof filter 21 as one side and indicated by a broken line, to ensure dustproof.

Usually, a temperature influences the modulus of elasticity of glass material, and is one of the causes to change the natural oscillation frequency of the material. Thus, it is necessary to measure a temperature during operation and consider a change in the natural oscillation frequency. It is desirable to measure a temperature change in the dustproof filter 21 provided to protect the front side of the image pickup element 27 whose temperature extremely rises during operation, and estimate the natural oscillation frequency at that time.

Therefore, in this case, a sensor (not shown) connected to the temperature measuring circuit 133 is provided to measure the temperatures around the image pickup element 27.

The temperature measuring point of the sensor is preferably set very close to the oscillation surface of the dustproof filter 21.

The mirror driving circuit 118 is a circuit to move and control the electret mirror of the movable mirror mechanism 13b to the reflecting position and transmitting position. When the movable mirror mechanism 13b is in the reflecting state, the luminous flux from the shooting optics 12a is led to the pentagonal prism 13a.

While the user can view an object through the eyepiece 13c adjacent to the pentagonal prism 13a, a part of the luminous flux passed through the pentagonal prism 13a is led to a photosensor (not shown) in the photometry circuit 121, where the well-known photometry is performed based on the amount of light detected there.

FIG. 3 shows the schematic configuration of the movable mirror mechanism 13b according to this embodiment. In the movable mirror mechanism 13b according to this embodiment, as shown in FIG. 3, a protection glass 313 is provided on a glass base plate (a driving electrode member) 315 as a fixed plate (a fixed element) with plurality of scanning electrodes 310 arranged on the surface at a given interval (e.g., 0.05 mm), through spacers 314-1 and 314-2. A part of the protection glass 313 is made as a transparent plate. A part of the area provided with the scanning electrodes 310 of the glass base plate 315 is made transparent or opened as a light transmission area.

A movable mirror member (light reflecting member) 312 is provided in the gap made between the spacers 314-1 and 314-2. The movable mirror member 312 is electrified (charged to be positive (+) and negative (−) here) like a belt at given intervals, and driven abreast along the glass base plate 315 by the electrifying charges and the Coulomb force generated by the voltage applied to the scanning electrode 310. The thickness of the members shown in the drawing is as follows. The glass base plate is 0.3 mm, the movable mirror is 40 μm, the spacer is 50 μm, and the protection glass is 0.1 mm.

FIGS. 4A and 4B show the states of the movable mirror mechanism 13b. FIG. 4A shows the state of the movable mirror mechanism 13b at shooting. FIG. 4B shows the state of the movable mirror mechanism 13b at observation. In the shooting state, as shown in FIG. 4A, the movable mirror member 312 moves to the right-half area of the glass base plate 315, and the whole transmission area 311 appears. In this case, the luminous flux reaching the movable mirror mechanism 13b from the shooting optics 12a is led to the image pickup element 27 through the light transmission area 311.

In the observation state, as shown in FIG. 4B, the movable mirror member 312 moves to the left-half area, and the whole transmission area 311 is covered by the movable mirror member 312. In this case, the luminous flux reaching the movable mirror mechanism 13b from the shooting optics 12a is reflected by the reflecting surface of the movable mirror member 312 and led to the pentagonal prism 13a.

The back of the glass base plate 315 or the protection glass 313 is coated to prevent charging.

FIG. 5A is a sectional view showing the configuration of the movable mirror member 312. The movable mirror member consists of a base material 312-2 made of glass or polyimide, an aluminum evaporated film 312-1 that is coated at need on one side becoming a reflecting surface, and an electret film 312-3 made of fluorocarbon resin on the other side of the base material 312-2.

The electret film 312-3 is formed by spin coating a fluorocarbon resin on the base material 312-2, and partially etched to expose a film at given intervals as shown in FIG. 5A. Only the exposed film portions are electrified by high field corona discharging.

FIG. 5B shows a modification of the movable mirror member 312. In this example, an electret portion 312-5 is formed by applying a high voltage to a plate 312-4 made of polyimide by approaching a needle electrode, and causing arc discharging in the space to the aluminum evaporated film 312-1 acting as an earth plate. The above process is repeated for each interval by scanning a needle electrode.

Figure 6:
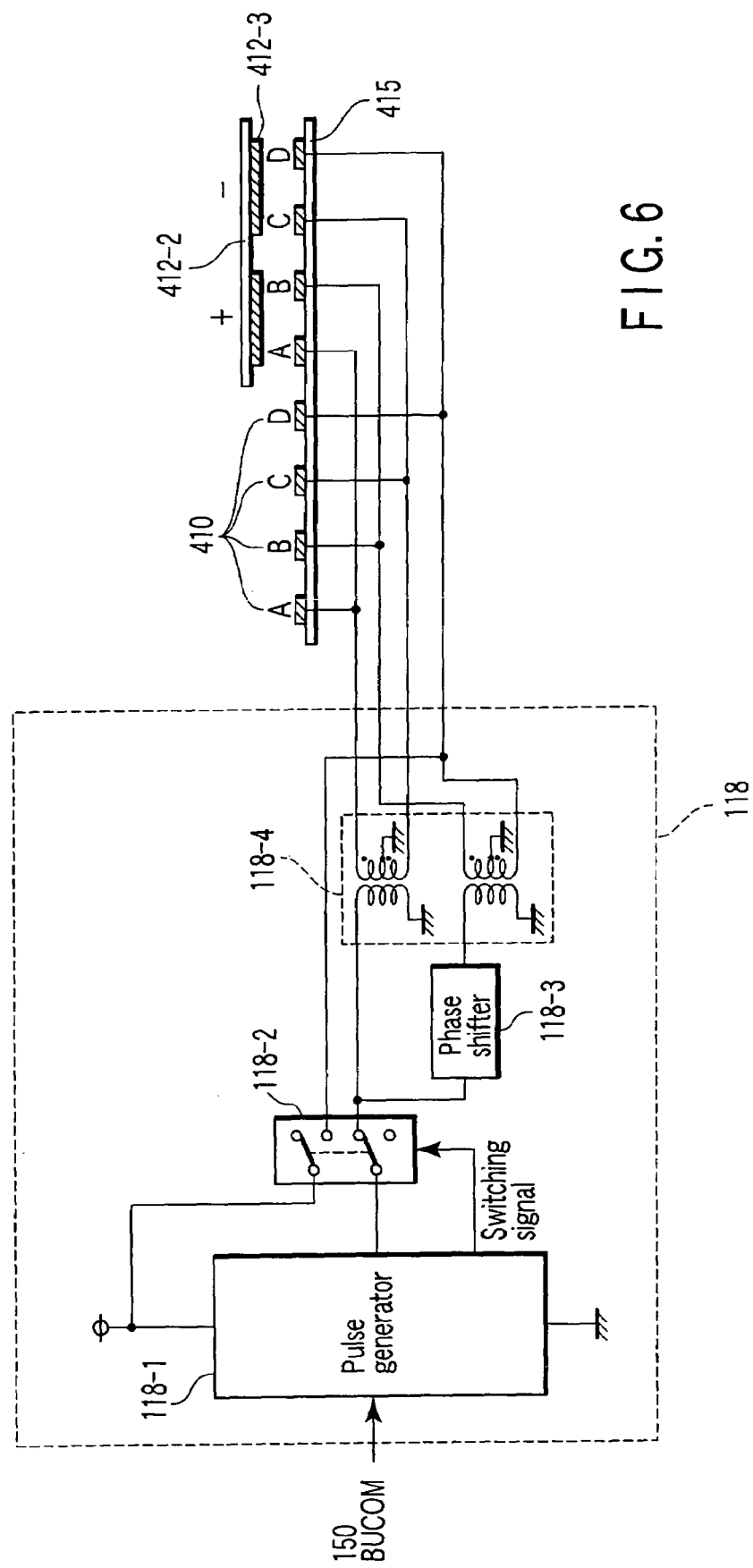
FIG. 6 shows the configuration of the mirror driving circuit 118 and movable mirror 13b shown in FIG. 2.

FIG. 6 show the configuration of the mirror driving circuit 118 and movable mirror 13b shown in FIG. 2. The scanning electrode 310 shown in FIG. 3 is realized as a driving electrode 410, and the glass base plate 314 is realized as a fixed element 415, respectively. The movable mirror member 312 is realized by a movable element 412-2 and electret film 412-3.

A pulse generator 118-1 generates a pulse of 1 k to several kHz from the control signal from the Bucom 150. The pulse signal output from the pulse generator 118-1 is supplied to a booster 118-4 to be boosted to about 100V, and then applied to A and B of driving electrodes 410 as driving signals (driving voltages). The driving signal applied to A and C are different in the phase by 180°. At the same time, the pulse signal is applied to a phase shifter 118-3 to be shifted in the phase by 90°, and then supplied to the booster 118-4 to be boosted to about 100V, and applied to B and D of the driving electrode 410 as driving signals. The driving signals applied to B and D are different in the phase by 180°. Thus, the driving signals with 90° different phases are applied to the driving electrodes A, B, C and D.

FIG. 6 is merely a schematic diagram. Actually, the number of electrodes and electret parts and the intervals among them are appropriately determined by various factors, such as, the apparatus size, transmission area largeness, electret polarities, arrangement of electrets, driving resolution, and moving speed. In this mirror apparatus, electret parts having positive and negative polarities are alternately positioned, but the type with electrodes of only one polarity is also realizable.

A conventional actuator requires about 1000V to drive, but by adopting an electret film as in this embodiment, an actuator can be driven by a low 100V voltage.

Figure 7:
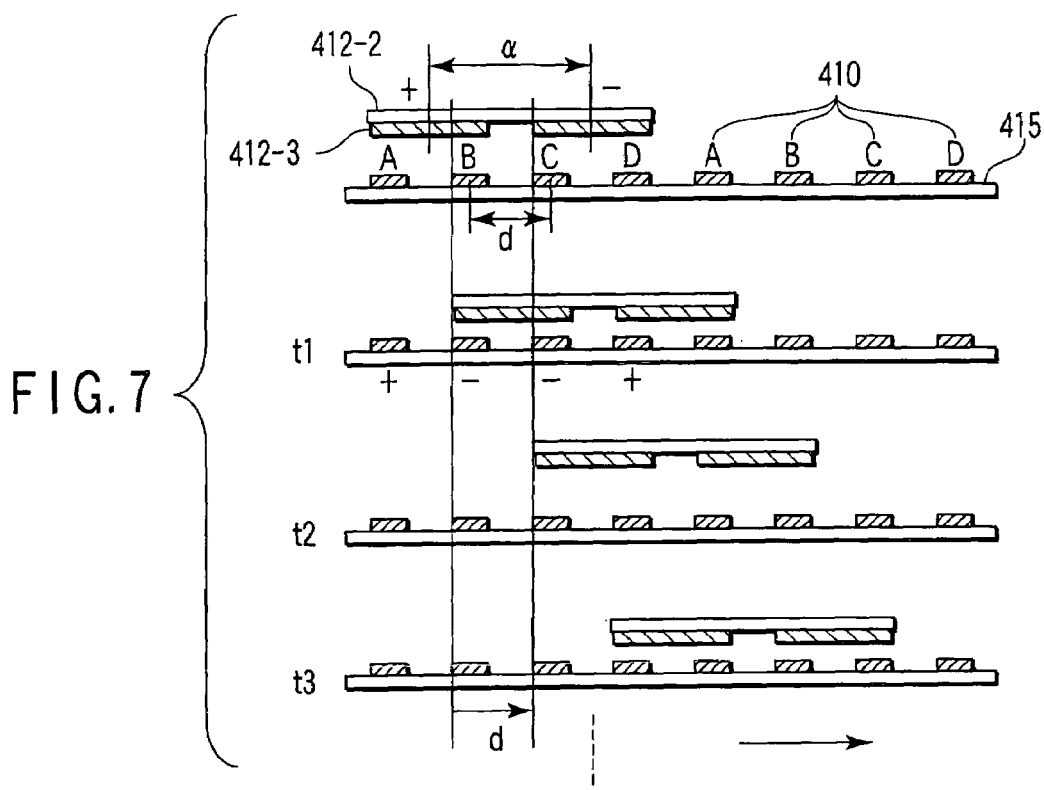
FIG. 7 shows the positions of movable elements on a fixed element at each time (t=t1, t2, t3)
Figure 8:
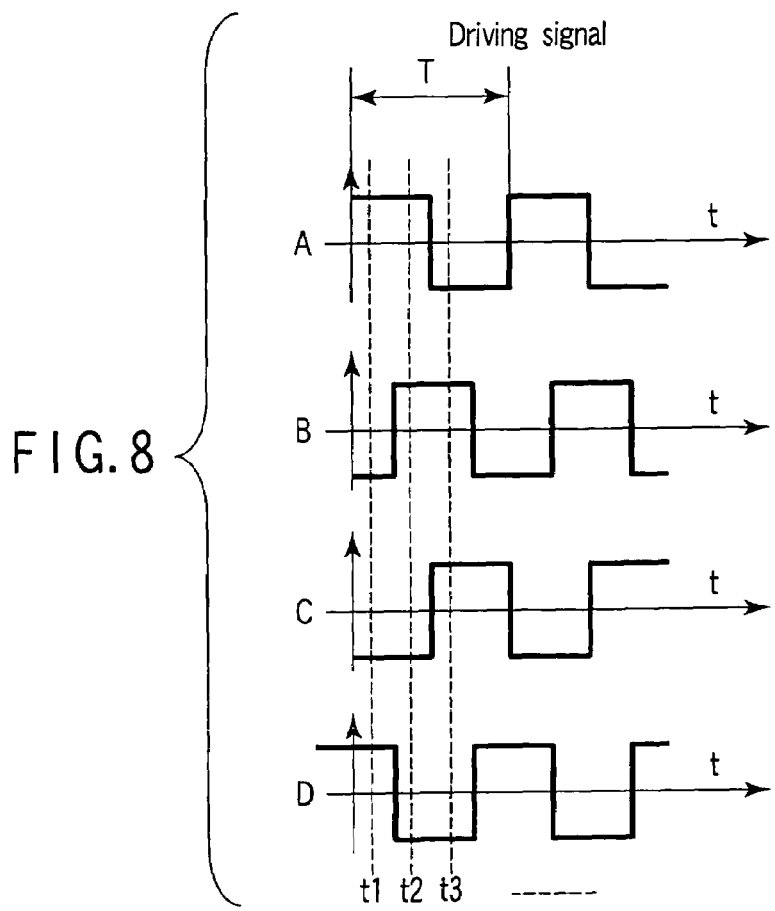
FIG. 8 shows the changes of driving signals applied to driving electrodes A, B, C and D at each time (t=t1, t2, t3, . . . )

FIG. 7 shows the positions of the movable element 412-2 on the fixed element at each time (t=t1, t2, t3). FIG. 8 shows the changes of the driving signals applied to the driving electrodes A, B, C and D at each time (t=t1, t2, t3, . . . ). When a driving signal for one pulse is applied to the electrodes A, B, C and D while the movable element 412-2 is in the initial position, the movable element 412-2 is moved to the right by the Coulomb force by a distance d or a pitch among the electrodes. When the driving signal of "+", "−", "−" and "+" are applied to the electrodes A, B, C and D, respectively, at the time t1, the movable element is moved further to the right by the Coulomb force by the distance d. Then, When the driving signal of "+", "+", "−" and "−" are applied to the electrodes A, B, C and D, respectively, at the time t2, the movable element 412-2 is moved further to the right by the Coulomb force by the distance d. Then, When the driving signal of "−", "+", "+" and "−" are applied to the electrodes A, B, C and D, respectively, at the time t3, the movable element 412-2 is moved further to the right by the Coulomb force by the distance d.

In this embodiment, the distance a to the center of the adjacent movable element 412-2 is set to two times the pitch d among the electrodes.

If a certain voltage is applied to D of the driving electrode 410 by switching a switch 118-2 (FIG. 6) by a switching signal after moving the movable element 412-2 by a given distance as described above, the movable element 412-2 is stopped at a given position by the Coulomb force.

Figure 9:
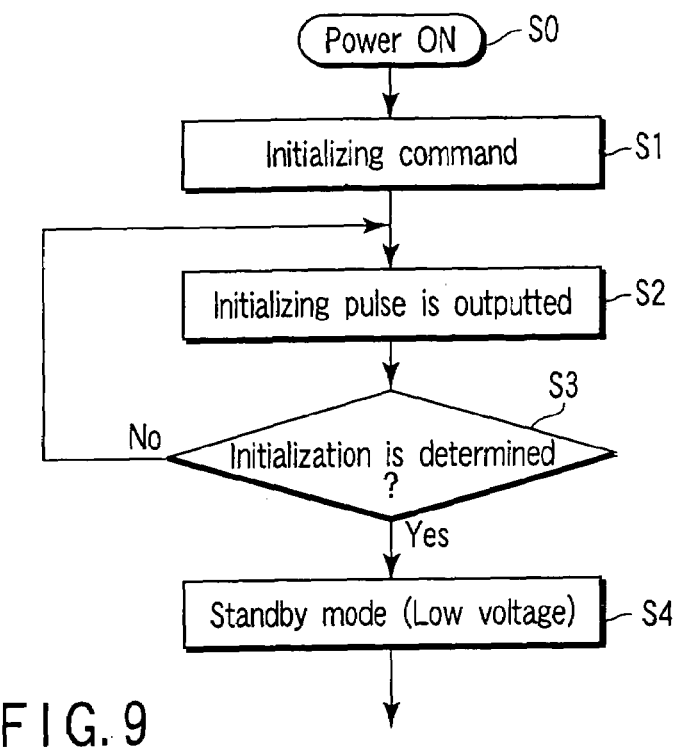
FIG. 9 is a view (example 1) for explaining a method of initializing the movable elements.
Figure 10A:
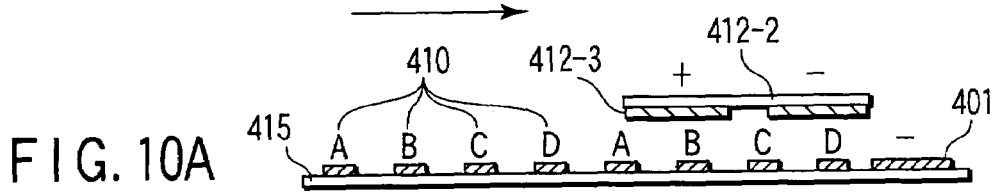
FIGS. 10A and 10B are views (example 2) for explaining a method of initializing the movable elements.
Figure 10B:
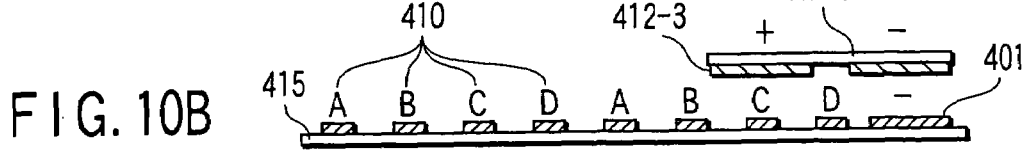

FIG. 9, FIG. 10A and FIG. 10B explain a method of initializing the movable element 412-2. The initializing mentioned here means that the movable element 412-2 is forcibly moved to a given position to define a present position, because it is impossible to identify the position of the movable element while the power is off. First, the power of the apparatus is turned on (step S0). An initializing command is sent from the Bucom 150 to the mirror driving circuit 118 (step S1). The mirror driving circuit 118 responds to the command and applies an initializing pulse to the driving electrode 410 of the movable mirror mechanism 13b (step S2). The movable element 412-2 is driven abreast by one pitch distance by the Coulomb force generated by the applied voltage and the charges in the movable element 412-2. Whether the initializing process is finished or not is determined based on the voltage value detected by a detection electrode 401 (step S3). If NO, return to step S2 and repeat the processing. If step S3 is YES, shift to standby mode, and drive the apparatus at a low voltage (step S4).

The detection electrode 401 detects a voltage value as follows. The movable element 412-2 is moved abreast on the driving electrode 410 by the same method as shown in FIG. 8, and finally arrived at the detection electrode 401. The voltage value detected by the detection voltage 401 is different according to the positions of the movable element 412-2 shown in FIGS. 10A and 10B. Thus, it is possible to confirm that the movable element 412-2 has moved to the position shown in FIG. 10B, that is, the initializing position.

Figure 11:
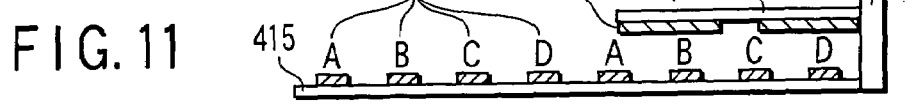
FIG. 11 is a view for explaining another initializing method.

FIG. 11 explains another initializing method. A given number of pulses is applied to the driving electrode 410 to move abreast the movable electrode to the butt-up 400, and this position is regarded as an initial position.

It is also possible to combine the methods of FIGS. 10A/10B and FIG. 11.

Figure 12:
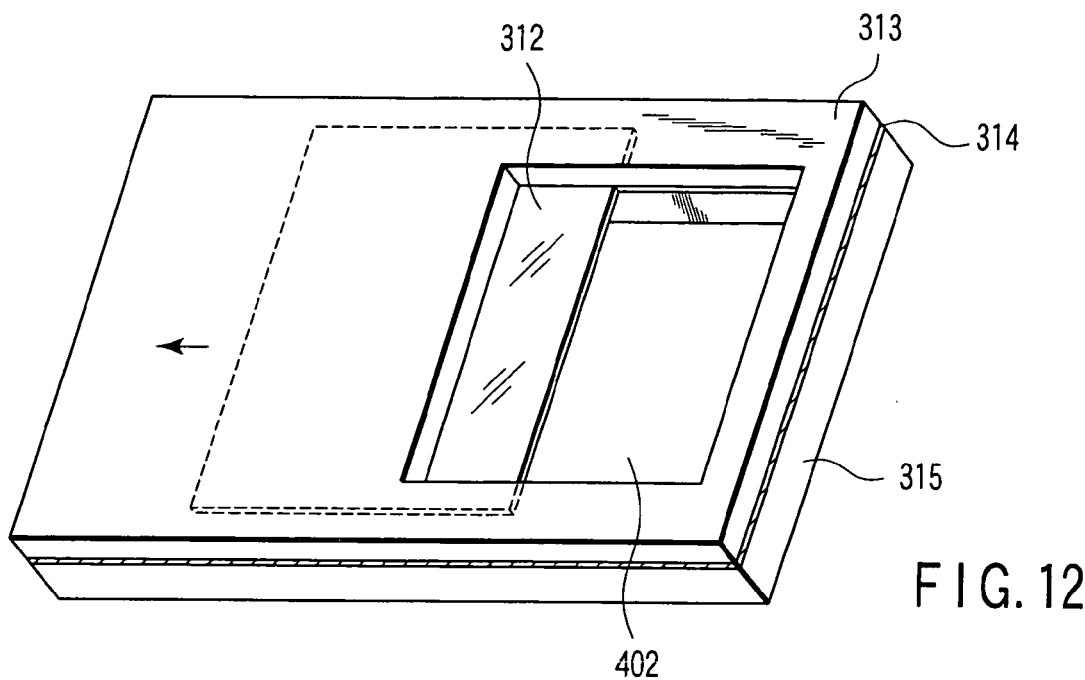
FIG. 12 is a view showing an embodiment of a light transmission area provided with a shooting window.

FIG. 12 shows an embodiment of the light transmission area 311 provided with a shooting window 402.

Explanation will be given on a modification of the movable mirror mechanism 13b with reference to FIGS. 13A–13D. In this modification, the movable mirror member 312 is divided into two parts, that is, a first movable mirror member 312A and a second movable mirror member 312B. The first and second mirror member 312A and 312B are relatively movable in the reverse direction to each other on a glass base plate provided with driving electrodes.

Figure 13A:
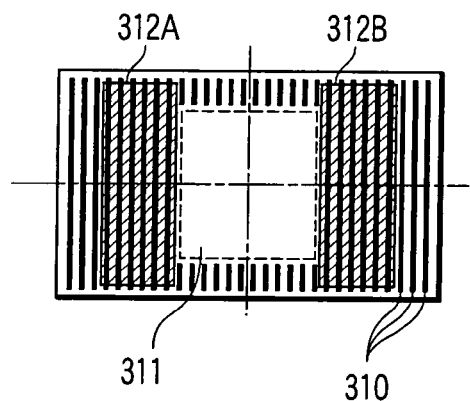
FIGS. 13A–13D are views showing a modification of the movable mirror mechanism 13b according to the embodiment.
Figure 13B:
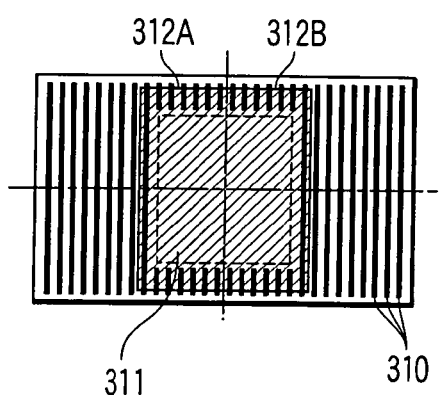
Figure 13C:
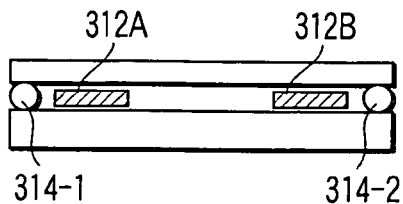
Figure 13D:
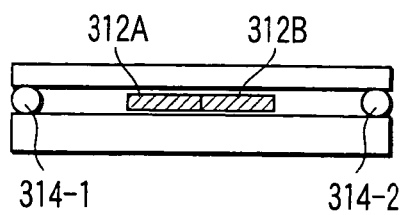

FIGS. 13A and 13C are the front view and sectional view of the movable mirror members 312A and 312B. In this state, the light transmission area 311 is not covered by the movable mirror members 312A and 312B, and the camera is in the shooting state. FIGS. 13B and 13D show the observation state that the movable mirror members 312A and 312B move to the center and completely cover the light transmission area 311. The member 314-1 is a stopper as a lock member to stop leftward movement of the movable mirror member 312A. The member 314-2 is a stopper as a lock member to stop rightward movement of the movable mirror member 312B.

Figure 14A:
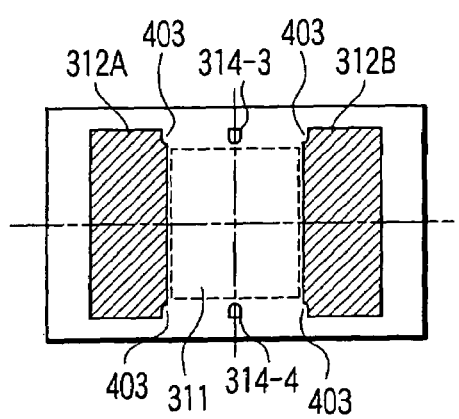
FIGS. 14A–14D are views showing a modification of the configuration shown in FIGS. 13A–13D.
Figure 14B:
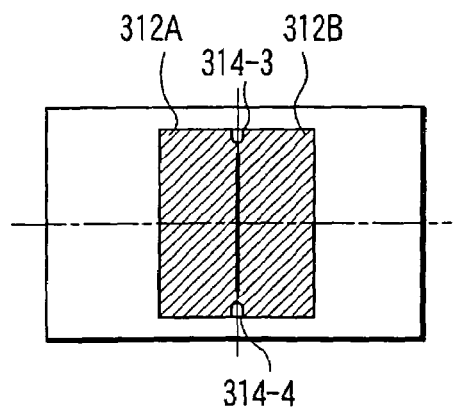
Figure 14C:
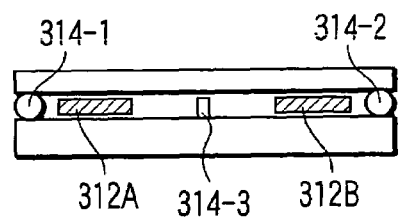
Figure 14D:
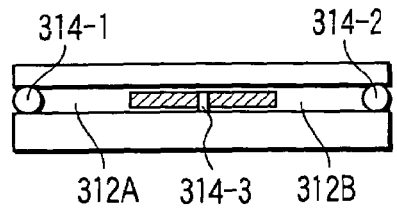

FIGS. 14A–14D shows a modification of the configuration shown in FIGS. 13A–13D. In this modification, in addition to the stoppers 314-1 and 314-2, stoppers 314-3 and 314-4 as lock members to stop movements of the movable mirror members 312A and 312B are provided close to the boundary of the moving areas of the movable mirror members 312A and 312B, and a notch 403 is formed in the portions opposite to the stoppers 314-3 and 314-4 of the movable mirror members 312A and 312B, respectively. FIGS. 14A and 14C show the shooting state. FIGS. 14B and 14D show the observation state.

Figure 15A:
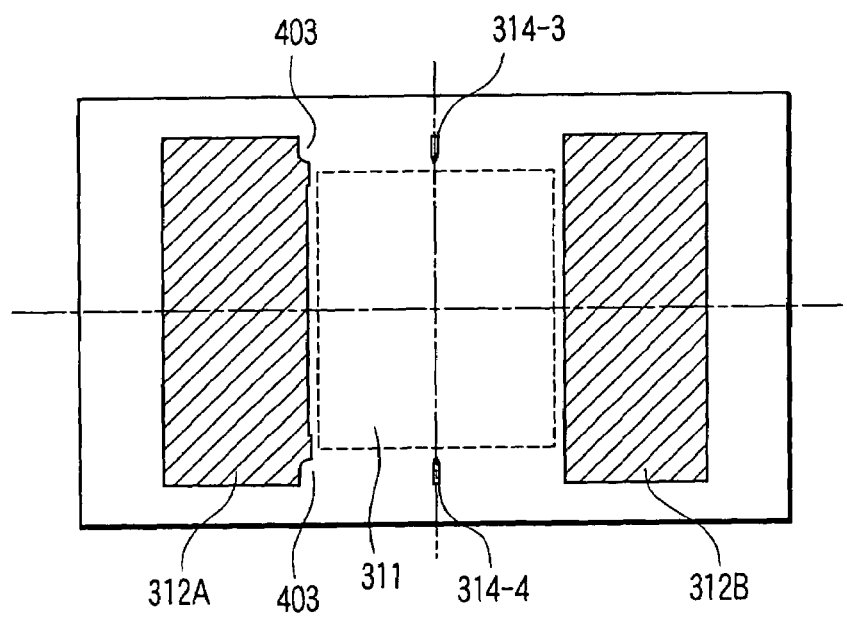
FIGS. 15A and 15B are views showing another modification of the configuration shown in FIGS. 13A–13D.
Figure 15B:
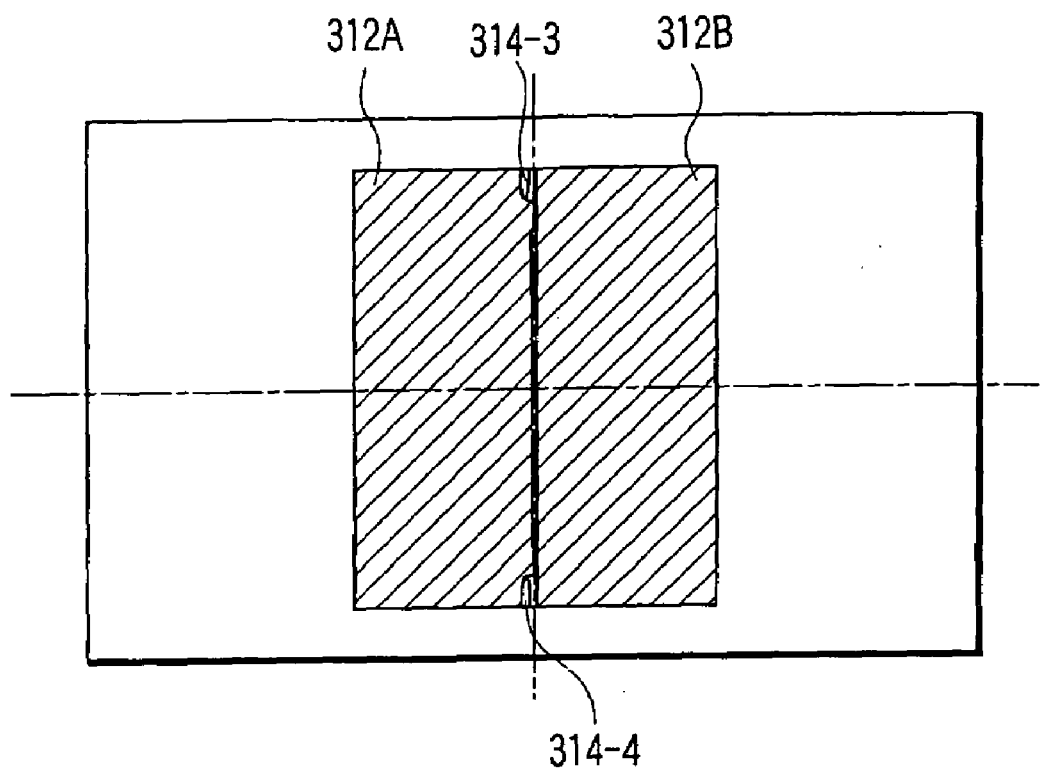

FIGS. 15A and 15B show another modification of the configuration shown in FIGS. 13A–13D. FIG. 15A shows the shooting state. FIG. 15B shows the observation state.

In this modification, like in FIGS. 14A and 14B, stoppers 314-3 and 314-4 as lock members to stop movement of the movable mirror members 312A and 312B are provided close to the boundary of the moving areas of the movable mirror members 312A and 312B, but a notch 403 is formed only in the movable mirror member 312A.

Figure 16:
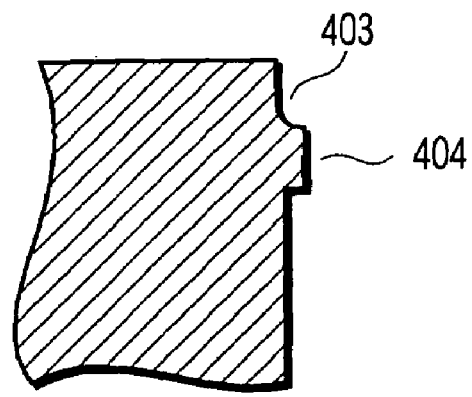
FIG. 16 is a view showing a notch in the modification of FIG. 15.

The movable mirror member 312A in this modification has a projection 404 in addition to the notch 403 as shown in FIG. 16. The height of this projection 404 is higher than the widths of the stoppers 314-3 and 314-4. Therefore, when the movable mirror member 312A moves to the right toward the center in the observation state, the movable mirror member 312A is stopped by the stoppers 314-3 and 314-4, but the movable mirror member 312B is stopped by the projection 404 before reaching the stoppers 314-3 and 314-4 when moving to the left toward the center. The projection 404 adjusts a micro gap generated in the boundary between the two movable mirror members 312A and 312B, regardless of the position accuracy of the stoppers 314-3 and 314-4.

In the above embodiment, the movable mirrors are electrified and charged to be positive (+) and negative (−), but it is permitted for ease of production to charge only to be positive (+) or negative (−) In the above embodiment, the mirror is switched between the state that at least the area of the optical path is transparent or opened, movable elements having a mirror function are moved abreast along the fixed base plate with scanning electrodes, thereby they exist on the optical path, and the state that the movable elements are retreated from the optical path. Therefore, it is possible to construct a movable mirror with minimized vibration and noise and reduced peak power consumption.

The movable elements are partially electrified, so that they are driven abreast by the electrifying charges and the Coulomb force generated by the voltage applied to the scanning electrodes, realizing low voltage high-speed driving.

The movable elements are held by the fixed base plate and protection plate, solving a dust problem.

The back of the fixed base plate or protection plate is coated to prevent charging, solving a problem that surrounding dust is attracted when scanning a relatively high voltage for driving.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A mirror apparatus having a reflecting surface to reflect an incident luminous flux, comprising:
    a fixed member having a plurality of driving electrodes on a surface of the fixed member;
    a movable member having the reflecting surface on one side, and capable of retreating out of an optical path of the incident luminous flux along the fixed member;
    a driving circuit capable of applying a voltage to the driving electrodes to generate an electrostatic force between the driving electrodes and the movable member, the driving circuit applying the voltage to the driving electrodes through a voltage-raising circuit to move the movable member, and applying the voltage to the driving electrodes without using the voltage-raising circuit to make the movable member static; and
    a control circuit for supplying a control signal to the driving circuit to change an electrostatic force acting on the movable member.

2. The mirror apparatus according to claim 1, wherein a protection member is provided at a position to hold the movable member together with the fixed member.

3. The mirror apparatus according to claim 2, wherein a luminous flux passing area to pass the incident luminous flux is provided in the fixed member and the protection member, and the movable member is movable between a position to close and a position to open the luminous flux passing area.

4. The mirror apparatus according to claim 3, wherein the luminous flux passing area is transparent or opened.

5. The mirror apparatus according to claim 2, wherein the back of the fixed member and/or the protection member is coated to prevent charging.

6. The mirror apparatus according to claim 1, wherein the movable member is dividable into two parts, which are movable in the reverse direction of each other with respect to the fixed member.

7. The mirror apparatus according to claim 6, wherein a lock member to stop movement is provided close to a boundary of moving areas of the movable members.

8. The mirror apparatus according to claim 1, wherein a plurality of electret parts are provided on the back of the reflecting surface of the movable member, and the movable member is driven by electrifying charges and Coulomb force generated by the voltage applied to the driving electrodes.

9. A mirror apparatus having a reflecting surface to reflect an incident luminous flux, comprising:
    a fixed member having a plurality of driving electrodes on a surface of the fixed member;
    a movable member having the reflecting surface on one side, and a plurality of electret parts on the other side, the movable member capable of retreating out of an optical path of the incident luminous flux along the fixed member; and
    a driving means to drive the movable member by acting a Coulomb force on the charges in the electret parts by applying a voltage periodically to the driving electrodes, the driving means making the movable member static by applying a constant voltage to the driving electrodes.

10. A mirror apparatus comprising:
    a driving electrode member having a plurality of driving electrodes on a surface of the driving electrode member; and
    a pair of light reflecting members having a light reflecting film and an electret part, which receives a driving force generated by the voltage applied to the driving electrodes, and is movable relatively in the reverse direction of each other on the driving electrode member.

11. A mirror apparatus comprising:
    a driving electrode member having a plurality of driving electrodes on a surface of the driving electrode member;
    a pair of light reflecting members having a light reflecting film and an electret part, which receives a driving force generated by the voltage applied to the driving electrodes, and is movable relatively in the reverse direction of each other on the driving electrode member; and
    a control means for controlling movement and stillness of the light reflecting members by giving the voltage to the driving electrodes, the control means applying a first voltage to the driving electrodes to move the reflecting members, and applying a second voltage lower than the first voltage to the driving electrodes to make the reflecting members static.

12. The mirror apparatus according to claim 10, wherein the driving electrode member consists of a light transmitting member.

13. The mirror apparatus according to claim 10, further comprising a protection member for protecting the light reflecting members, wherein the light reflecting members are arranged to be held by the driving electrode member and the protection member.

14. The mirror apparatus according to claim 10, further comprising a lock member to stop movement of said pair of light reflecting members which is provided close to a boundary of moving areas of said pair of light reflecting members.

15. The mirror apparatus according to claim 10, further comprising a lock member to stop movement of one of said pair of light reflecting members which is provided close to a boundary of moving areas of said pair of light reflecting members, wherein movement of the other light reflecting member of said pair of light reflecting members is stopped by the lock member.

16. The mirror apparatus according to claim 11, wherein the driving electrode member consists of a light transmitting member.

* * * * *